United States Patent
Wolczko et al.

(10) Patent No.: US 8,732,442 B2
(45) Date of Patent: May 20, 2014

(54) METHOD AND SYSTEM FOR HARDWARE-BASED SECURITY OF OBJECT REFERENCES

(75) Inventors: Mario I. Wolczko, San Carlos, CA (US); Gregory M. Wright, Mountain View, CA (US); Matthew L. Seidl, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1280 days.

(21) Appl. No.: 12/145,657

(22) Filed: Jun. 25, 2008

(65) Prior Publication Data

US 2009/0327666 A1    Dec. 31, 2009

(51) Int. Cl.
*G06F 9/00* (2006.01)
*G06F 9/44* (2006.01)
*G06F 15/00* (2006.01)

(52) U.S. Cl.
USPC .......................................... 712/226; 712/225

(58) Field of Classification Search
None
See application file for complete search history.

(56) References Cited

U.S. PATENT DOCUMENTS

| | | | |
|---|---|---|---|
| 5,900,001 A | 5/1999 | Wolczko et al. | |
| 7,171,540 B1 | 1/2007 | Seidl et al. | |
| 7,246,141 B2 | 7/2007 | Wolczko et al. | |
| 7,249,255 B2 | 7/2007 | Anand | |
| 2003/0126590 A1* | 7/2003 | Burrows et al. | 717/154 |
| 2005/0251706 A1* | 11/2005 | Alexander et al. | 714/49 |

OTHER PUBLICATIONS

Wright et al.; An object-aware memory architecture; Feb. 2005; Sun Labs.*
Wright, G., Seidl, M. L., Wolczko, M., An Object-Aware Memory Architecture, SMLI TR-2005-143, Feb. 2005, 34 pages.

* cited by examiner

*Primary Examiner* — Corey S Faherty
(74) *Attorney, Agent, or Firm* — Osha Liang LLP (57) ABSTRACT

A method for managing data, including obtaining a first instruction for moving a first data item from a first source to a first destination, determining a data type of the first data item, determining a data type supported by the first destination, comparing the data type of the first data item with the data type supported by the first destination to test a validity of the first instruction, and moving the first data item from the first source to the first destination based on the validity of the first instruction.

12 Claims, 8 Drawing Sheets

| | SOURCE 702 | DATA TYPE 704 | MEANS FOR IDENTIFYING SOURCE DATA TYPE 706 | DESTINATION 708 | DATA TYPE SUPPORTED BY DESTINATION 710 | MEANS FOR IDENTIFYING DESTINATION DATA TYPE 712 | VALID INSTRUCTION? 714 |
|---|---|---|---|---|---|---|---|
| 1 | RS | Reference | Page Table Entry | IS | Non-Reference | Page Table Entry | NO |
| 2 | RS | Reference | Page Table Entry | RRF | Reference | Register File | YES |
| 3 | RS | Reference | Page Table Entry | IRF | Non-Reference | Register File | NO |
| 4 | RS | Reference | Page Table Entry | OI | Non-Reference | Offset Sign | NO |
| 5 | RS | Reference | Page Table Entry | OR | Reference | Offset Sign | YES |
| 6 | IS | Non-Reference | Page Table Entry | RRF | Reference | Register File | NO |
| 7 | IS | Non-Reference | Page Table Entry | IRF | Non-Reference | Register File | YES |
| 8 | IS | Non-Reference | Page Table Entry | OI | Non-Reference | Offset Sign | YES |
| 9 | IS | Non-Reference | Page Table Entry | OR | Reference | Offset Sign | NO |
| 10 | RRF | Reference | Register File | IRF | Non-Reference | Register File | NO |
| 11 | RRF | Reference | Register File | OI | Non-Reference | Offset Sign | NO |
| 12 | RRF | Reference | Register File | OR | Reference | Offset Sign | YES |
| 13 | IRF | Non-Reference | Register File | OI | Non-Reference | Offset Sign | YES |
| 14 | IRF | Non-Reference | Register File | OR | Reference | Offset Sign | NO |
| 15 | OI | Non-Reference | Offset Sign | OR | Reference | Offset Sign | NO |

RS = Registers Stack
IS = Immediates Stack
RRF = References Register File
IRF = Immediates Register File
OI = Object's Immediates
OR = Object's References Instructions 799

METHOD AND SYSTEM FOR HARDWARE-BASED SECURITY OF OBJECT REFERENCES

BACKGROUND

As object-oriented programming languages become more widely used, computer systems are being designed to manipulate objects more efficiently. In general, these high-performance and complex object-based systems access an object using an object reference, which is a pointer identifying the base address of the object in memory.

One way of compromising security in an object-based system is to convince the system that a non-reference value (i.e., an immediate value, such as an integer or character) is an object reference. If successful, this kind of exploit may result in unauthorized access to arbitrary objects and/or data within the application and the run-time environment (e.g., internal state of a virtual machine). Although the design of an object-based system may, in theory, preclude such a violation, it may inadvertently allow such an exploit because of one or more software bugs within the execution engine of the object-based system.

It is desirable that such bugs not lead to compromises, adhering to the principle of "defense in depth" (i.e., each layer of the system providing its own security guarantees and defenses). Accordingly, one or more embodiments of the invention provide a system and method to minimize the likelihood that an immediate value (i.e., a non-reference value) will be treated as an object reference, and used to access (maliciously or otherwise) an object.

SUMMARY

In general, in one aspect, the invention relates to a method for managing data. The method comprising obtaining a first instruction for moving a first data item from a first source to a first destination; determining a data type of the first data item; determining a data type supported by the first destination; comparing the data type of the first data item with the data type supported by the first destination to test a validity of the first instruction; and moving the first data item from the first source to the first destination based on the validity of the first instruction.

In general, in one aspect, the invention relates to a computer readable medium storing instructions for managing a data item. The instructions comprising functionality to obtain a first instruction for moving the data item from a source to a destination; determine a data type of the data item; determine a data type supported by the destination; compare the data type of the data item with the data type supported by the destination to test a validity of the instruction; and move the data item from the source to the destination based on the validity.

In general, in one aspect, the invention relates to a system for managing a data item. The system comprising: a source storing a data item; a destination supporting a destination data type; an execution engine operatively connected to the source and the destination, wherein the execution engine is configured to test a validity of an instruction to move the data item from the source to the destination by comparing a data type of the data item and the destination data type.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for maintaining data type integrity as data is moved between registers, stacks, and/or memory locations in a heap. In general, embodiments of the invention provide a system and method for maintaining data type integrity by ensuring the destination of a data item movement instruction supports the data type of the data item.

Figure 1:
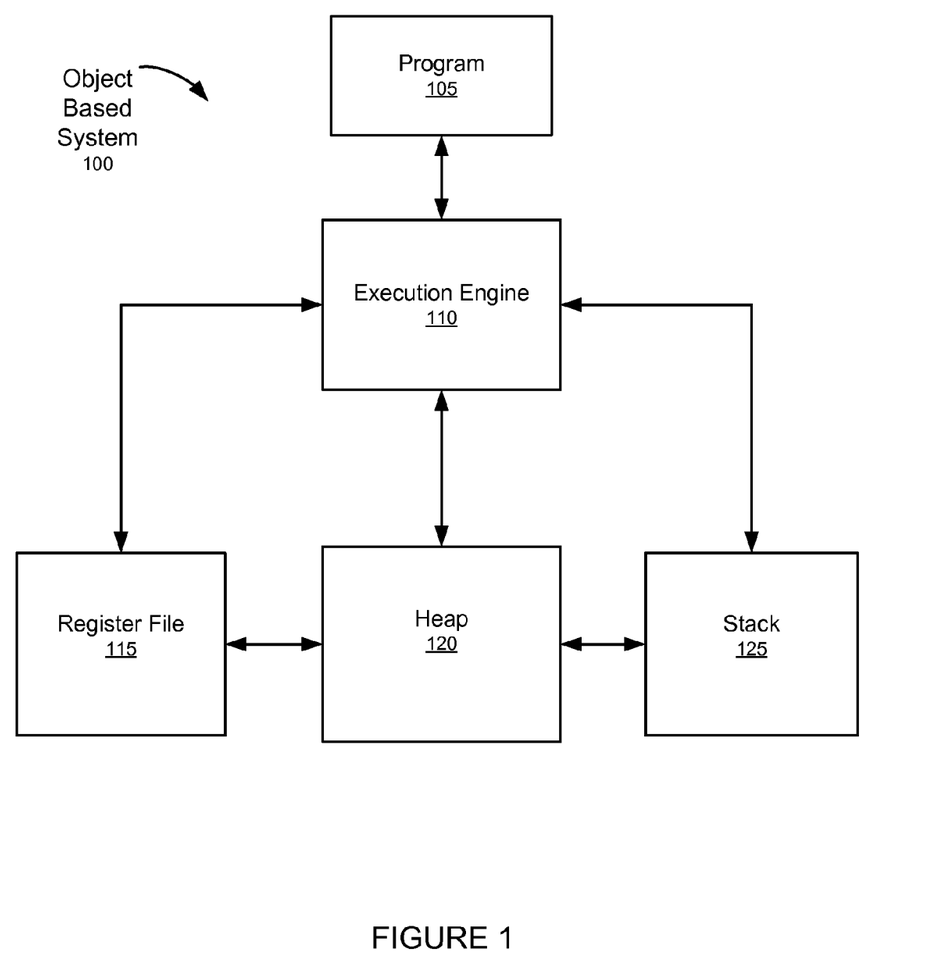
FIG. 1 shows an object-based system in accordance with one or more embodiments of the invention.

FIG. 1 shows an object-based system (100) in accordance with one or more embodiments of the invention. As shown in FIG. 1, the object-based system (100) may include a program (105), an execution engine (110), a register file (115), a heap (120), and a stack (125). In one or more embodiments of the invention, the object-based system (100) is a Java™ Virtual Machine (JVM™). (JVM™ and JVM™ are registered trademarks of Sun Microsystems, Inc., of Santa Clara, Calif.). Each component of the object-based system (100) is discussed below.

In one or more embodiments of the invention, the heap (120) corresponds to a portion of memory storing one or more objects. Each object stored in the heap (120) may occupy a block of the memory (i.e., a series of memory locations). The block of memory allocated to an object includes both references to other objects and non-reference values (i.e., immediates). The block of memory may also include an object header comprising object metadata (such as state bits for garbage collection and a reference to the object's class).

In one or more embodiments of the invention, an object stored in the heap (120) is referenced using a pointer, which directly or indirectly identifies a word in the object's header. When a program (e.g., program (105)) requests a new object to be created, a memory allocator in the execution engine (110) identifies a region of free memory in the heap (120), allocates the region of free memory to the object, and returns a pointer to the newly-created object.

In one or more embodiments of the invention, the register file (115) includes one or more registers (not shown). Each register stores one or more bits of a data item, and said bits may be accessed (i.e., for a read or write operation) simultaneously. Registers may transmit and/or accept data items to/from other registers. A register may be of any size including 8-bits, 16-bits, 64-bits, etc.

In one or more embodiments of the invention, the stack (125) is an area of memory with a fixed origin and a variable number of entries. Each entry in a stack may store a data item and may be referred to as a stack location. Those skilled in the art, having the benefit of this detailed description, will appreciate that a push and a pop operation may be used to add and remove, respectively, data items to/from the stack.

Those skilled in the art, having the benefit of this detailed description, will appreciate that a stack pointer may be used to reference a stack location. Specifically, the stack pointer may reference the most recently added data item in the stack. Those skilled in the art, having the benefit of this detailed description, will also appreciate that a stack may be stored on one or more pages of memory. In one or more embodiments of the invention, a table entry for each memory pages identifies whether that stack page holds references or immediates.

In one or more embodiments of the invention, the program (105) corresponds to a set of instructions that perform a task when executed. The set of instructions may include data movement instructions for moving a data item from a source (e.g., a register, a heap location, a stack location) to a destination (e.g., a register, a heap location, a stack location) (discussed below). The program (105) may be written in a high-level programming language and compiled to machine code or may be directly written in a low-level programming language (i.e., assembly).

In one or more embodiments of the invention, the execution engine (110) corresponds to a combination of hardware and/or software elements that execute the instructions of the program (105). The execution engine (110) may include functionality to identify the data type (i.e., a reference, a non-reference) of a data item. The data type may be determined based on the source of the data item. Similarly, the execution engine (110) may be configured to determine the data type(s) supported by the destination of a data movement instruction (discussed below).

In one or more embodiments of the invention, data type information is associated with each data item in the heap (120), in the stack (125), and in the registers of the register file (115) to maintain data type system integrity. This additional data type information is used to distinguish a reference from a non-reference, and allows data movement instructions (e.g., load instructions, store instructions, register-to-register operations, etc.) to check that input data is being used in a manner consistent with the data type information.

Figure 2A:
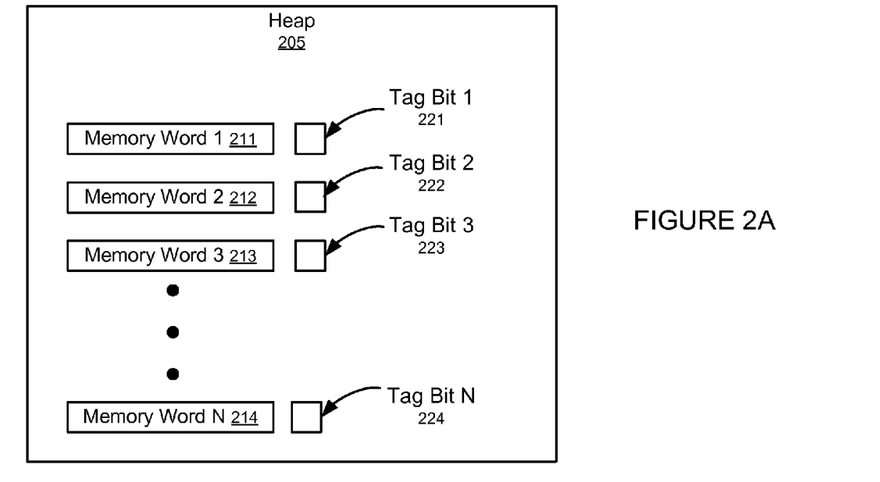
FIG. 2A and FIG. 2B show memory heaps in accordance with one or more embodiments of the invention.

FIG. 2A shows a heap (205) in accordance with one or more embodiments of the invention. The heap (205) may be essentially the same as the heap (120), discussed above in reference to FIG. 1. As shown in FIG. 2A, the heap (205) includes one or more memory words (i.e., Memory Word 1 (211), Memory Word 2 (212), Memory Word 3 (213), . . . , Memory Word N (214)) and multiple tag bits (i.e., Tag Bit 1 (221), Tag Bit 2 (222), Tag Bit 3 (223), . . . , Tag Bit N (224)).

In one or more embodiments of the invention, there is a tag bit for each memory word in the heap. Specifically, each tag bit identifies the data type of the data item stored in the corresponding memory word. For example, the tag bit 1 (221) identifies the data type of the data item in the memory word 1 (211). Similarly, the tag bit 2 (222) identifies the data type of the data item in the memory word 2 (212). Further, the tag bit 3 (223) identifies the data type of the data item stored in the memory word 3 (213). Further still, the tag bit N (224) identifies the data type of the data item stored in the memory word N (214).

A tag bit (221, 222, 223, 224) of value "0" may indicate that the data type of the data item is a reference. A tag bit (221, 222, 223, 224) of value "1" may indicate that the data type of the data item is a non-reference. Those skilled in the art, having the benefit of this detailed description, will appreciate that other tag values may be used to distinguish references from non-references and that a tag may be of any size. In addition, tag values may be used to identify various types of immediates (e.g., floats, integers, etc.). In one or more embodiments of the invention, a tag bit (221, 222, 223, 224) is accessed (i.e., read) to identify the data type of the stored data item. Similarly, a tag bit (221, 222, 223, 224) may be set to reflect the data type of the stored data item.

Figure 2B:
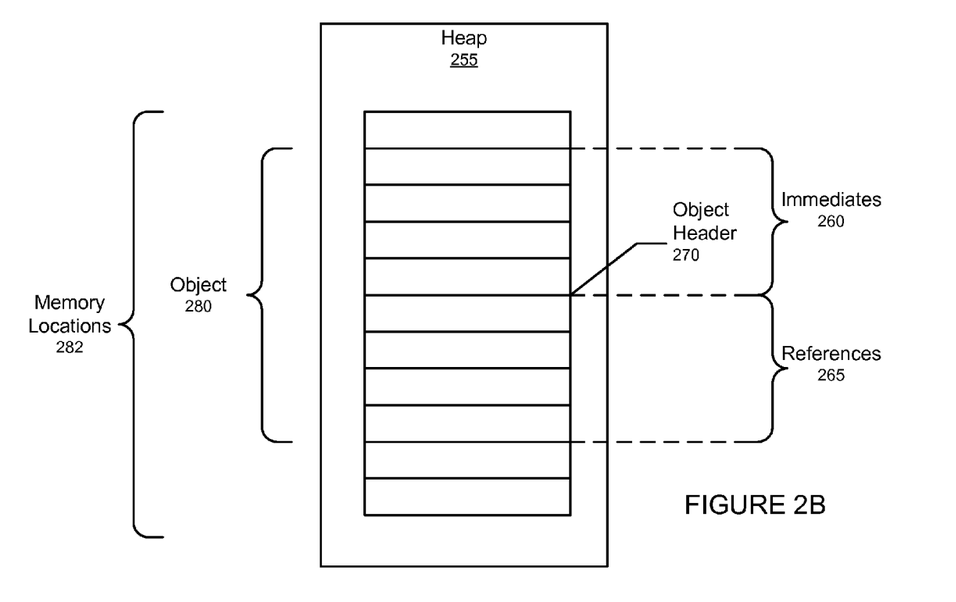

FIG. 2B shows an alternative heap (255) in accordance with one or more embodiments of the invention. The heap (255) may be essentially the same as the heap (120), discussed above in reference to FIG. 1. As shown in FIG. 2B, the heap (255) includes multiple memory locations (282). The object (280) occupies a subset of the memory locations (282) in the heap (255). As discussed above, the object (280) is referenced by the object header (270). As also discussed above, the object (280) may include one or more immediates (260) and one or more references (265) to other objects.

In one or more embodiments of the invention, immediate values (260) of the object (280) are stored in memory locations on one side of the object header (270) while object references (265) are stored in memory locations on the other side of the object header (270) (e.g., immediates are at numerically higher addresses, and object references at numerically lower addresses). In such embodiments, a pointer for object (280) points into the object header (270), negative offsets from the object reference address references (265) to other objects, and non-negative offsets address immediates (260). The heap (255) may be referred to as having a bifurcated layout.

Those skilled in the art, having the benefit of this detailed description, will appreciate the sign of the offset may be used to identify the data type of the data item (e.g., a negative offset indicates a reference, a non-negative offset indicates a non-reference). Similarly, the sign of the offset may be used to determine the data type supported by the memory location addressed by the offset.

Figure 3A:
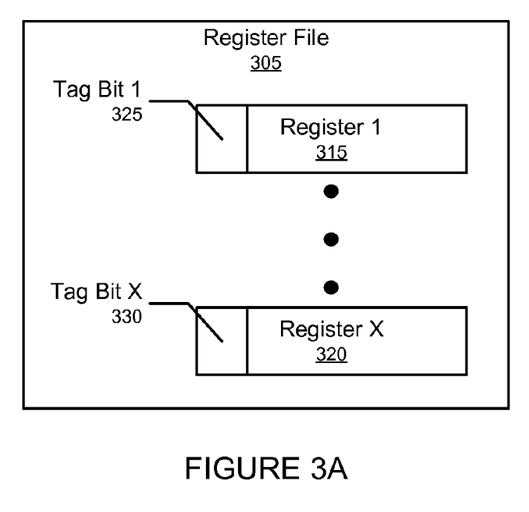
FIG. 3A and FIG. 3B show register files in accordance with one or more embodiments of the invention.

FIG. 3A shows a register file (305) in accordance with one or more embodiments of the invention. The register file (305) may be essentially the same as the register file (115) discussed above in reference to FIG. 1. As shown in FIG. 3A, the register file (305) includes one or more registers (i.e., Register 1 (315), . . . , Register X (320)). As also shown in FIG. 3A, the register file (305) includes multiple tag bits (i.e., Tag Bit 1 (325), . . . , Tag Bit X (330)). In one or more embodiments of the invention, there is a tag bit for each register in the register file (305). Specifically, each tag bit identifies a data type of the data item stored in the corresponding register. For example, the tag bit 1 (325) identifies the data type of the data item in the register 1 (315). Similarly, the tag bit X (330) identifies the data type of the data item in the register X (320).

A tag bit (325, 330) of value "0" may indicate that the data type of the data item is a reference. A tag bit (325, 330) of value "1" may indicate that the data type of the data item is a non-reference. Those skilled in the art, having the benefit of this detailed description, will appreciate that other tag values may be used to distinguish references from non-references and that a tag may be of any size. In addition, tag values may be used to identify various types of immediates (e.g., floats, integers, etc.). In one or more embodiments of the invention, a tag bit (325, 330) is accessed (i.e., read) to identify the data type of the stored data item. Similarly, a tag bit (325, 330) may be set to reflect the data type of the stored data item.

Figure 3B:
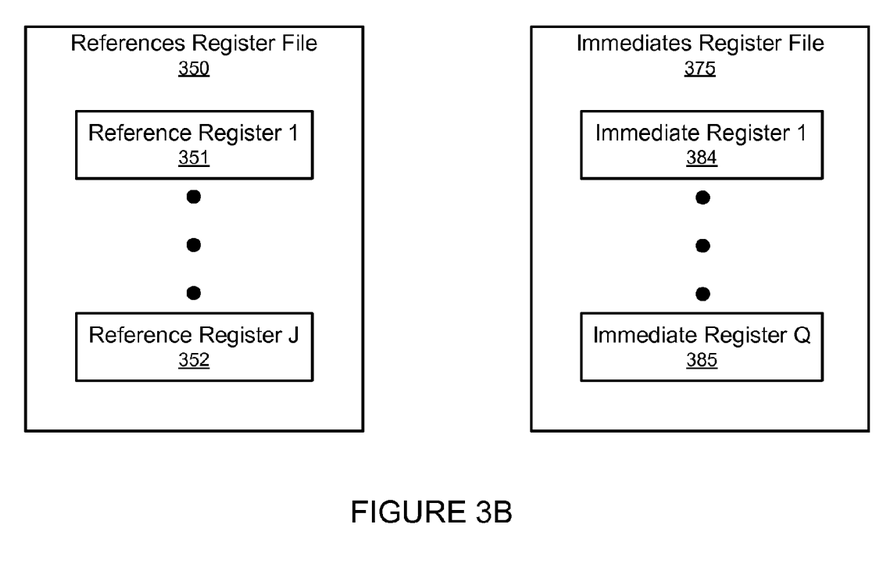

FIG. 3B shows segregated register files (i.e., References Register File (350), Immediates Register File (375)) in accordance with one or more embodiments of the invention. The segregated register files (350, 375) may effectively replace the register file (115) discussed above in reference to FIG. 1. As shown in FIG. 3B, the References Register File (350) includes one or more registers (i.e., Reference Register 1 (351), . . . , Reference Register J (352)). Similarly, the Immediates Register File (375) includes one or more registers (i.e., Immediate Register 1 (384), . . . , Immediate Register Q (385)). Those skilled in the art, having the benefit of this detailed description, will appreciate the References Register File (350) and the Immediates Register File (375) may have any number of registers.

In one or more embodiments of the invention, the References Register File (350) only stores references. In contrast, the Immediates Register File (375) only stores non-references. For example, the reference register 1 (351) and the reference register J (352) belong to the references register file (350). Accordingly, the reference register 1 (351) and the reference register J (352) store references. Similarly, the immediate register 1 (384) and the immediate register Q (385) belong to the immediates register file (375). Accordingly, the immediate register 1 (384) and the immediate register Q (385) store non-references. In one or more embodiments of the invention, an incoming reference should only be stored in a register of the references register file (350). In contrast, a non-reference should only be stored in a register of the immediates register file (375).

Figure 4A:
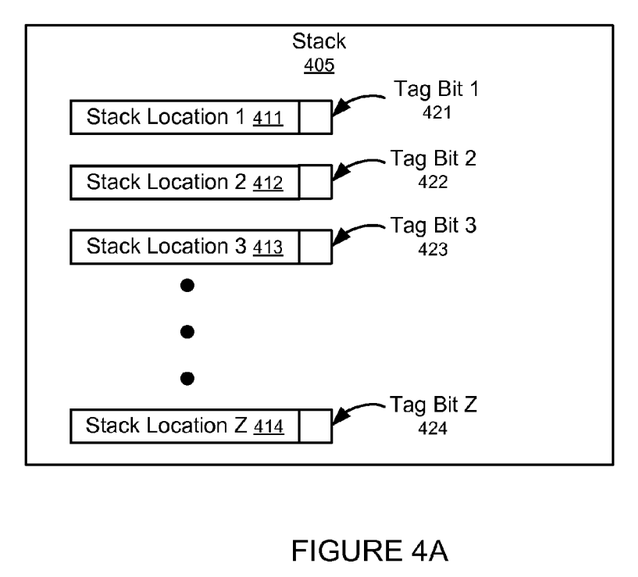
FIG. 4A and FIG. 4B show stacks in accordance with one or more embodiments of the invention.

FIG. 4A shows a stack (405) in accordance with one or more embodiments of the invention. The stack (405) may be essentially the same as the stack (125) discussed above in reference to FIG. 1. As shown in FIG. 4A, the stack (405) includes one or more stack locations (i.e., Stack Location 1 (411), Stack Location 2 (412), Stack Location 3 (413), Stack Location Z (414)). As also shown in FIG. 4A, the stack (405) includes one or more tag bits (i.e., Tag Bit 1 (421), Tag Bit 2 (422), Tag Bit 3 (423), Tag Bit Z (424)). In one or more embodiments of the invention, there is a tag bit for each stack location in the stack (405). Specifically, each tag bit identifies a data type of the data item stored in the corresponding stack location. For example, the tag bit 1 (421) identifies the data type of the data item stored in the stack location 1 (411). Similarly, the tag bit 2 (422) identifies the data type of the data item stored in the stack location 2 (412). Further, the tag bit 3 (423) identifies a data type of the data item stored in the stack location 3 (413). Further still, the tag bit Z (424) identifies a data type of the data item stored in the stack location Z (414).

A tag bit (421, 422, 423, 424) of value "0" may indicate that the data type of the data item is a reference. A tag bit (421, 422, 423, 424) of value "1" may indicate that the data type of the data item is a non-reference. Those skilled in the art, having the benefit of this detailed description, will appreciate that other tag values may be used to distinguish references from non-references and that a tag may be of any size. In one or more embodiments of the invention, a tag bit (421, 422, 423, 424) is accessed (i.e., read) to identify the data type of the stored data item. Similarly, a tag bit (421, 422, 423, 424) may be set to reflect the data type of the stored data item.

Figure 4B:
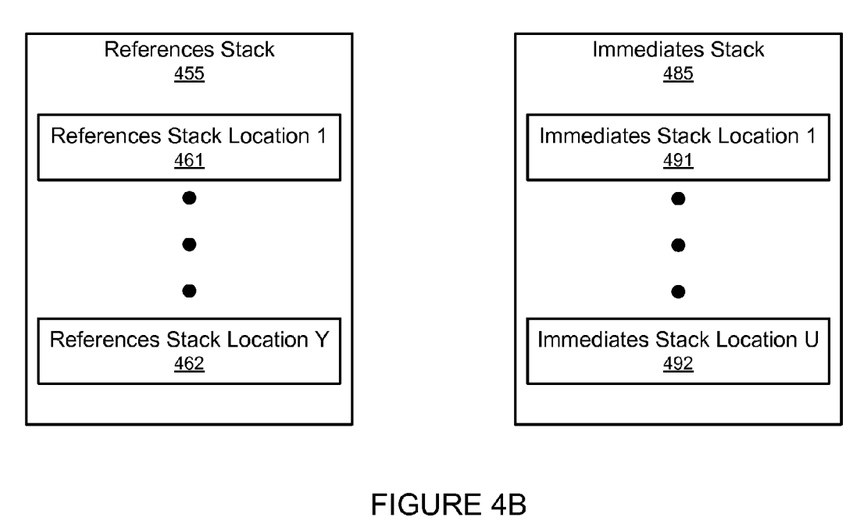

FIG. 4B shows segregated stacks (i.e., References Stack (455), Immediates Stack (485)) in accordance with one or more embodiments of the invention. The segregated stacks (455, 485) may replace stack (125), discussed above in reference to FIG. 1. As shown in FIG. 4B, the references stack (455) includes one or more stack locations (i.e., References Stack Location 1 (461), . . . , References Stack Location Y (462)). Similarly, the immediates stack (485) includes one or more stack locations (i.e., Immediates Stack Location 1 (491), . . . , Immediates Stack Location U (492)). Those skilled in the art, having the benefit of this detailed description, will appreciate that the References Stack (455) and the Immediates Stack (485) may be of any size.

In one or more embodiments of the invention, the references stack (455) stores only references. In contrast, the immediates stack stores only non-references (485). Accordingly, an incoming reference should only be stored in the references stack (455). Similarly, an incoming non-reference should only be stored in the immediates stack (485). In one or more embodiments of the invention, the segregated stacks (455, 485) may be selected using two stack pointer registers (not shown), one stack pointer register for the references stack and one stack pointer register for the immediate stacks.

In one or more embodiments of the invention, the references stack (455) and the immediates stack (485) are maintained on different memory pages. A page table entry exists for each of the memory pages, and may identify the data type of the stack. Accordingly, by accessing the page table entry, the data type of all data items in the page are known. Further, by accessing the page table entry, the data type supported by the stack (and all stack locations) is known.

Figure 5:
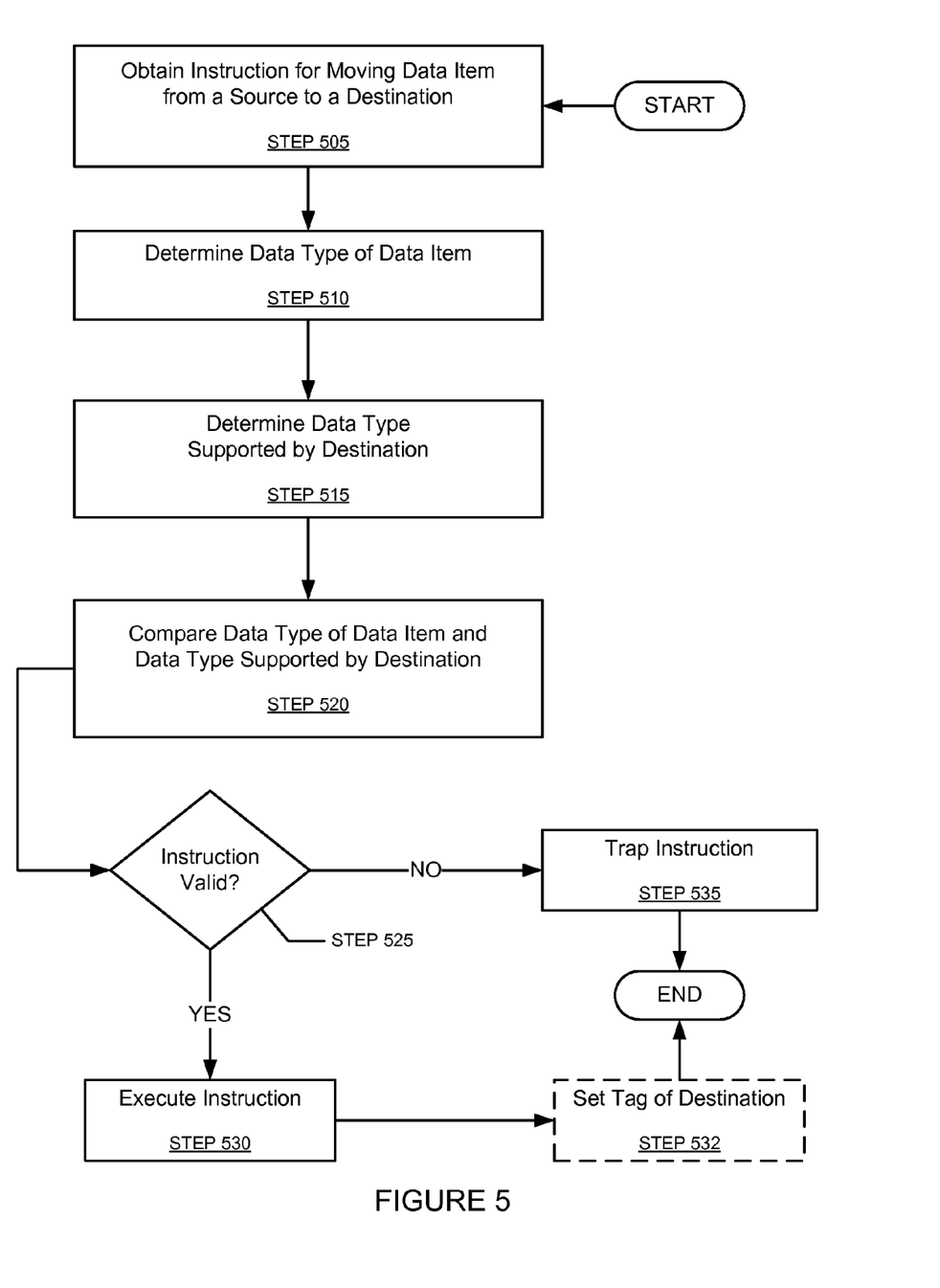
FIG. 5 shows a flowchart in accordance with one or more embodiments of the invention.

FIG. 5 shows a flowchart in accordance with one or more embodiments of the invention. The process shown in FIG. 5 may be used, for example, by the object based system (100) for maintaining data type integrity. Those skilled in the art, having the benefit of this detailed description, will appreciate the sequence of steps shown in FIG. 5 may differ among embodiments of the invention, and that one or more of the steps may be optional.

Initially, an instruction for moving a data item from a source to a destination is obtained (STEP 505). The instruction may belong to a program (e.g., program (105) discussed above in reference to FIG. 1) and the data item may be a reference or a non-reference. The instruction may be a load instruction, a store instruction, a register-to-register operation, a stack-to-stack operation, a register-to-stack operation, a stack-to-register operation, etc. Accordingly, the source may be a register, a stack location, a memory location in a heap, etc. Similarly, the destination may be a register, a stack location, a memory location in a heap, etc.

In STEP 510, the data type of the data item is determined. In one or more embodiments of the invention, the data type is determined by accessing a tag of the source (i.e., reading a tag of the source register, reading a tag of the source stack location, reading a tag of the source memory location, etc.). However, when the source is a memory location in a bifurcated heap, a register in a segregated register file, a stack location in a segregated stack, etc., determining the data type of the data item is more complex.

In one or more embodiments of the invention, when the source of the data item is a memory location in a bifurcated heap (e.g., heap (255) discussed above in reference to FIG. 2B), the sign of the pointer offset used to address the source memory location indicates the data type of the data item. For example, a negative pointer offset indicates the data item in the source memory location is a reference. In contrast, a non-negative pointer offset indicates the data item in the source memory location is a non-reference. As an alternative, a negative pointer offset may indicate that the data item in the source memory location is a non-reference, while a non-negative pointer offset may indicate that the data item in the source memory location is a reference.

In one or more embodiments of the invention, when the source of the data item is a register in a segregated register file (e.g., References Register File (350), Immediates Register File (375)), the data type of the data item is known from the register file. For example, if the source register belongs to a references register file, the data item in the source register is a reference. Similarly, if the source register belongs to an immediates register file, the data item stored in the source register is a non-reference.

Still referring to STEP 510, in one or more embodiments of the invention, when the source is a stack (i.e., References Stack (455), Immediates Stack (485)), the data type of the data item may be determined by accessing a page table entry. As discussed above, a stack may be stored on a page of memory, and the page of memory includes a page table entry with a field identifying the data type of the stack. Accordingly, if the source stack location belongs to a references stack (i.e., as denoted by said field in the page table entry for the stack), the data item is a reference. Similarly, if the source stack location belongs to an immediates stack (i.e., as denoted by said field in the page table entry for the stack), the data item is a non-reference.

In STEP 515, the data type(s) supported by the destination are determined. In one or more embodiments of the invention, when the destination is associated with a tag (i.e., a tag is used to identify the data type of a data item stored in the destination), the destination may support both references and non-references. However, when the destination is a memory location in a bifurcated heap, a register in a segregated register file, a segregated stack, etc., determining the data type supported by the destination is more complex.

In one or more embodiments of the invention, when the destination is a memory location in a bifurcated heap (e.g., heap (255) discussed above in reference to FIG. 2B), the data type supported by the memory location is determined from the sign of the pointer offset used to address the memory location. For example, a negative pointer offset indicates the destination memory location supports references. Similarly, a non-negative pointer offset indicates the destination memory location supports non-references. As an alternative, a negative pointer offset may indicate the destination memory location supports non-references while a non-negative pointer offset indicates the destination memory location supports references.

In one or more embodiments of the invention, when the destination is a register in a segregated register file (e.g., References Register File (350), Immediates Register File (375)), the data type supported by the destination register is known from the segregated register file. For example, if the destination register belongs to a references register file, the destination register supports references. However, if the destination register belongs to an immediates register file, the destination register supports non-references.

Still referring to STEP 515, in one or more embodiments of the invention, when the destination is a segregated stack (e.g., References Stack (455), Immediates Stack (485)), the data type supported by the destination stack is based on a page table entry. As discussed above, a stack may be stored on a page of memory, and the page of memory includes a page table entry with a field identifying the data type of the stack. Accordingly, if said field indicates the data type of the stack is references, all stack locations in the stack support references. However, if said field indicates the data type of the stack is non-references, all stack locations in the stack are non-references.

In STEP 520, a comparison is made between the data type of the data item and the data type supported by the destination. In STEP 525, it is determined whether the instruction is valid based on the comparison of STEP 520. In other words, it is determined whether the data type of the data item is supported by the destination. In one or more embodiments of the invention, when it is determined that the data type of the data item is supported by the destination, the instruction is deemed valid and the process proceeds to STEP 530. However, when it is determined that the data type of the data item is not supported by the destination, the instruction is deemed invalid and the process proceeds to STEP 535.

In STEP 530, the instruction is executed. In other words, the data item is moved from the source to the destination as set forth in the instruction. In one or more embodiments of the invention, if the destination is tagged (i.e., the data type of the data item stored in the destination is indicated using a tag), the instruction sets the tag of the destination to reflect the data item (STEP 532). For example, a tag value of "0" may be used to indicate the stored data item is a reference, while a tag value of "1" may be used to indicate the data item is a non-reference. Those skilled in the art, having the benefit of this detailed description, will appreciate STEP 532 is optional and depends on whether the destination is tagged. Those skilled in the art, having the benefit of this detailed description, will also appreciate that the tag may be of any size, and that the tag may further identify the type of immediate (e.g., float, integer, etc.).

In STEP 535, the invalid instruction is trapped and prevented from being executed. Those skilled in the art, having the benefit of this detailed description, will appreciate a trapped instruction may be a malicious instruction attempting to destroy the data type integrity of the object based system. An alert of type inconsistency may be issued, an exception may be thrown, a thread of execution may be suspended or terminated, and/or additional suitable actions may be performed.

Although embodiments of the invention have been directed towards an instruction for moving a single data item, those skilled in the art, having the benefits of this detailed description, will appreciate that the process shown in FIG. 5 may be used to handle instructions for moving any number of data items. In such embodiments, the data type of each data item must by supported by the corresponding destination. In the event at least one destination does not support the data type of the corresponding data item, the instruction may be deemed invalid.

Although at least one embodiment of the invention has been focused on maintaining data integrity when executing instructions that move data, those skilled in the art, having the benefit of this detailed description, will appreciate that other embodiments of the invention may be used to maintain data integrity when executing any type of instruction. For example, consider an arithmetic instruction that accepts two immediates (i.e., operands) and a destination for the result as inputs. One or more embodiments of the invention may be used to check that the destination is for an immediate, or used to tag the destination as storing an immediate.

Although at least one embodiment of the invention has been focused on flagging all mismatched data type combinations (i.e., immediate source—reference destination, reference source—immediate destination, etc.) as invalid, those skilled in the art, having the benefit of this detailed description, will appreciate that in other embodiments of the invention, some mismatched or ambiguous combinations may be acceptable. For example, a register that always contains a zero could serve both as an immediate source and as a reference source. As an additional example, the object allocator may, when the privilege level is elevated, convert an immediate value to that of the supported reference type (effectively circumventing/satisfying the data type checks).

Figure 6:
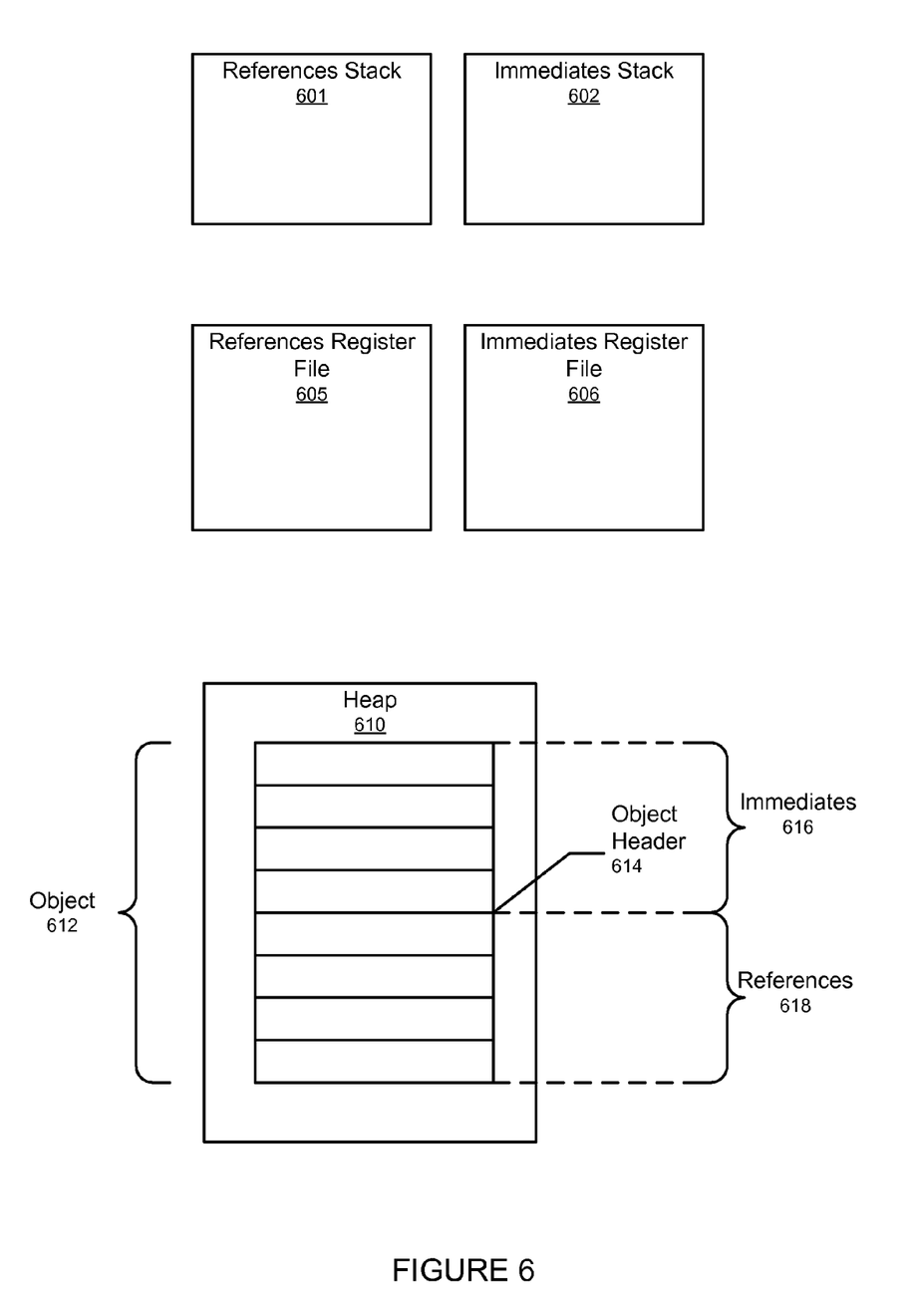
FIG. 6 shows an example in accordance with one or more embodiments of the invention.

FIG. 6 shows an example system (600) in accordance with one or more embodiments of the invention. As shown in FIG. 6, the example system (100) includes a bifurcated heap (610) storing an object (612). The object (612) is identified using an object header (614) and the object (612) includes both immediates (616) and references (618) to other objects. Negative offsets from the object header are used to address the references (618) while non-negative offsets (i.e., an offset of zero or a positive offset) from the header are used to address the immediates (616). The example also includes segregated reference register files (i.e., References Register File (605), Immediates Register File (606)) and segregated stacks (i.e., References Stack (601), Immediates Stack (602)). The segregated register files (605, 606) may include any number of registers. Similarly, the segregated stacks (601, 602) may be of any size (i.e., have any number of stack locations).

Figure 7:
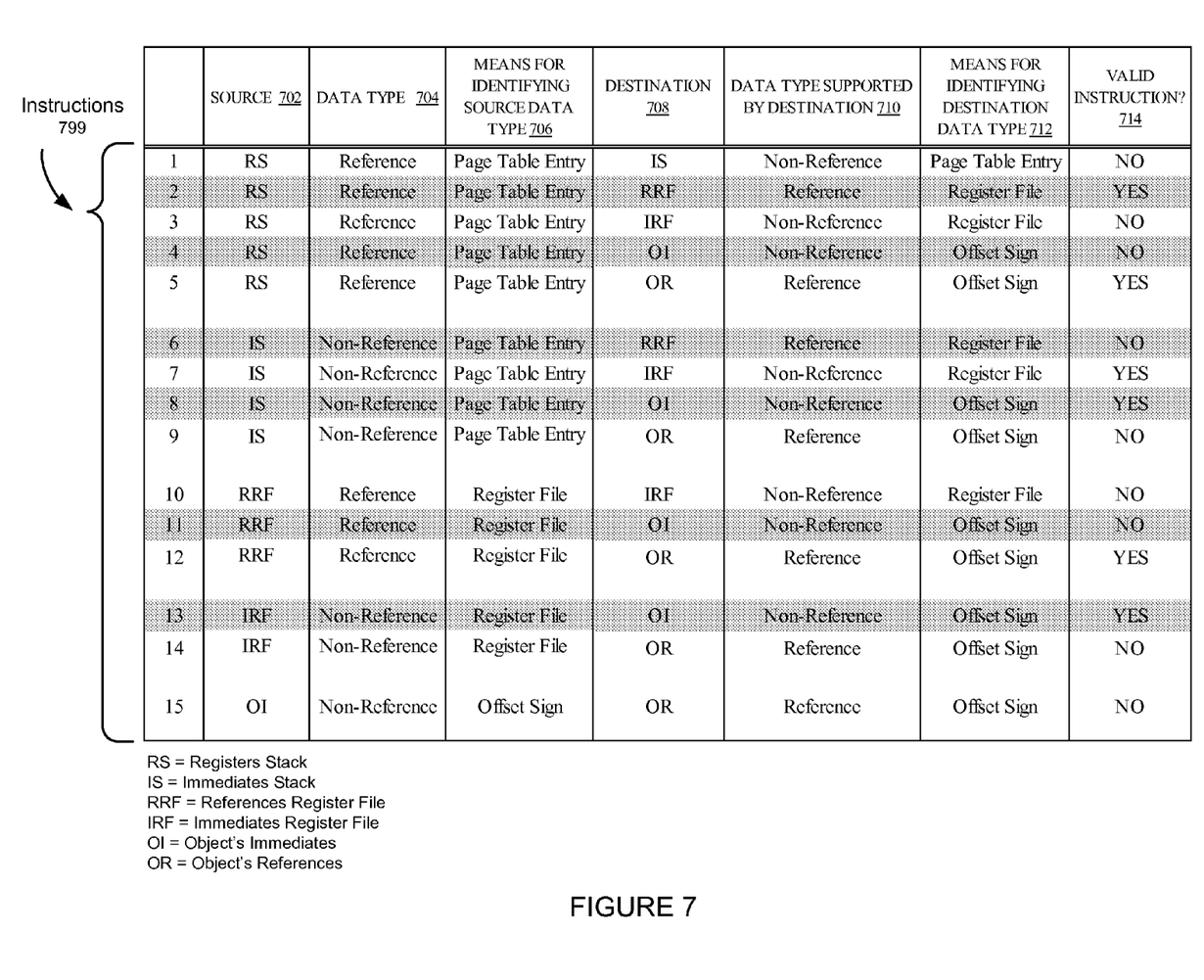
FIG. 7 shows a chart in accordance with one or more embodiments of the invention.

FIG. 7 shows a chart detailing operation of the example system shown in FIG. 6. As shown in FIG. 7, the chart lists fifteen (15) example instructions (799) for executing on the system shown in FIG. 6. For each instruction, the source (702) storing the data item, the data type of data item (704), the means of identifying the data type of the data item (706), the destination (708), the data type supported by the destination (710), the means of identifying the data type supported by the destination (712), and the validity of the instruction (714) are indicated.

Those skilled in the art, having the benefit of this detailed description, will appreciate one or more embodiments of the invention may be used to maintain data type integrity by ensuring that instruction to move data cannot violate type integrity by preventing them from intermingling types in a way which would lead to violations.

Figure 8:
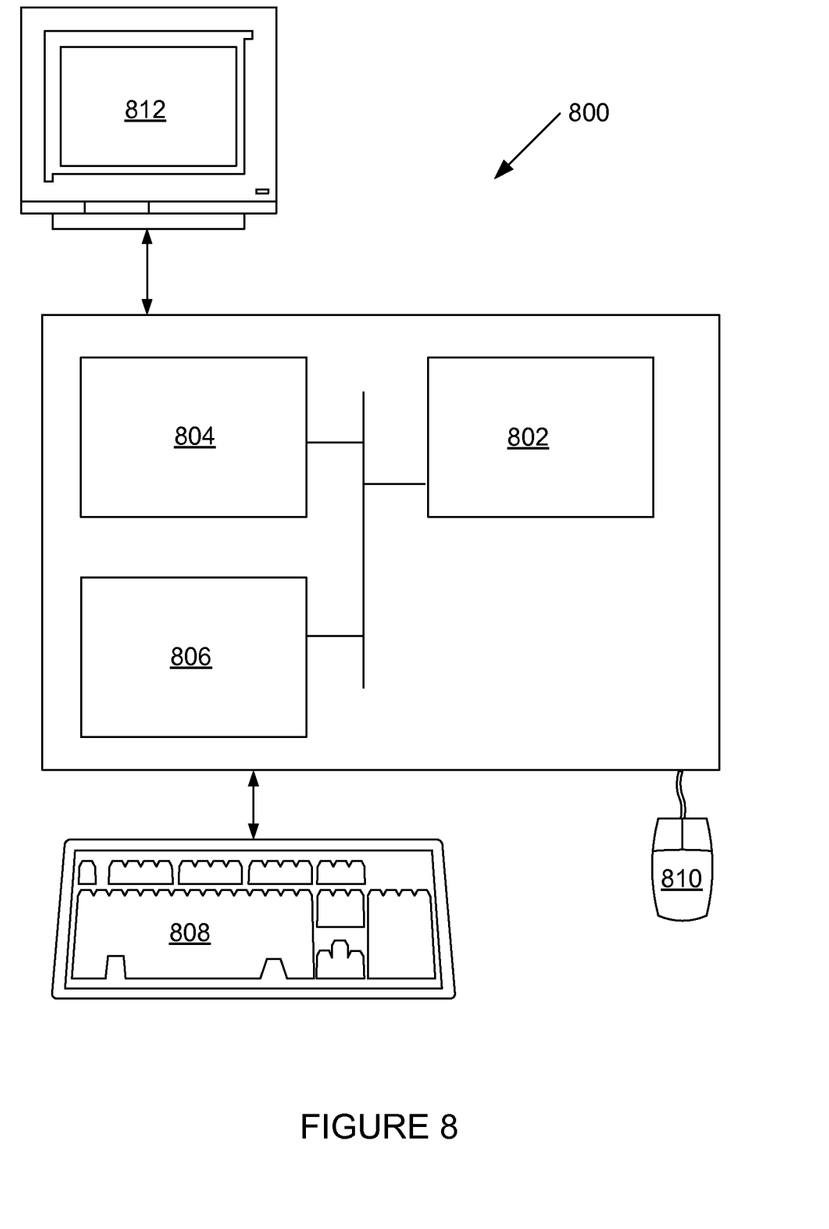
FIG. 8 shows a computer system in accordance with one or more embodiments of the invention.

The invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., execution engine, heap, stack register file, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing data, comprising:
identifying a thread executing on a hardware processor;
identifying, in a first memory page corresponding to the thread, a references stack storing a plurality of object references;
identifying, in a second memory page corresponding to the thread, an immediates stack storing a plurality of immediate values;
obtaining, from the thread, a first instruction for moving a first data item from a first source to a first destination;
determining, based on a page table entry of the first source, that the first data item is among the plurality of immediate values and that the first source is located in the immediates stack;
determining, based on a page table entry of the first destination, that the first destination is located in the references stack;
determining, based on the first source being located in the immediates stack and the first destination being in the references stack, that the first instruction is invalid; and
trapping the first instruction in response to determining the first instruction is invalid.

2. The method of claim 1, further comprising:
obtaining, from the thread, a second instruction for moving a second data item from a second source to a second destination;
determining, based on a page table entry of the second source, that the second data item is an second immediate value of the plurality of immediate values and that the second source is located in the immediates stack;
determining, based on a page table entry of the second destination, that the second destination is located in the immediates stack;
determining, based on the second source being in the immediates stack and the second destination being located in the immediates stack, that the second instruction is valid; and
executing the second instruction in response to determining the second instruction is valid.

3. The method of claim 1, further comprising:
obtaining, from the thread, a second instruction for moving a second data item from a second source to a second destination;
determining, based on a page table entry of the second source, that the second data item is an object reference of the plurality of object references and that the second source is located in the references stack;
determining, based on a page table entry of the second destination, that the second destination is located in the immediates stack;
determining, based on the second source being in the references stack and the second destination being located in the immediates stack, that the second instruction is invalid; and
trapping the second instruction in response to determining the second instruction is invalid.

4. The method of claim 1, further comprising:
accessing the page table entry of the first source and the page table entry of the first destination in a translation lookaside buffer.

5. A computer readable storage medium storing instructions for managing data, the instructions comprising functionality to:

identify a thread executing on a hardware processor;
identify, in a first memory page corresponding to the thread, a references stack storing a plurality of object references;
identify, in a second memory page corresponding to the thread, an immediates stack storing a plurality of immediate values;
obtain, from the thread, a first instruction for moving a first data item from a first source to a first destination;
determine, based on a page table entry of the first source, that the first data item is among the plurality of immediate values and that the first source is located in the immediates stack;
determine, based on a page table entry of the first destination, that the first destination is located in the references stack;
determine, based on the first source being located in the immediates stack and the first destination being in the references stack, that the first instruction is invalid; and
trap the first instruction in response to determining the first instruction is invalid.

6. The computer readable storage medium of claim 5, wherein the instructions further comprise functionality to:
obtain, from the thread, a second instruction for moving a second data item from a second source to a second destination;
determine, based on a page table entry of the second source, that the second data item is an immediate value of the plurality of immediate values and that the second source is located in the immediates stack;
determine, based on a page table entry of the second destination, that the second destination is located in the immediates stack;
determine, based on the second source being in the immediates stack and the second destination being located in the immediates stack, that the second instruction is valid; and
execute the second instruction in response to determining the second instruction is valid.

7. The computer readable storage medium of claim 5, further comprising:
obtaining, from the thread, a second instruction for moving a second data item from a second source to a second destination;
determining, based on a page table entry of the second source, that the second data item is an object reference of the plurality of object references and that the second source is located in the references stack;
determining, based on a page table entry of the second destination, that the second destination is located in the immediates stack;
determining, based on the second source being in the references stack and the second destination being located in the immediates stack, that the second instruction is invalid; and
trapping the second instruction in response to determining the second instruction is invalid.

8. The computer readable storage medium of claim 5, wherein the instructions further comprise functionality to:
access the page table entry of the first source and the page table entry of the first destination in a translation lookaside buffer.

9. A system for managing data, comprising:
a processor;
a thread executing on the processor and comprising a first instruction for moving a first data item from a first source to a first destination;
a first memory page corresponding to the thread and comprising a references stack storing a plurality of object references;
a second memory page corresponding to the thread and comprising an immediates stack storing a plurality of immediate values; and
an execution engine comprising functionality to:
determine, based on a page table entry of the first source, that the first data item among the plurality of immediate values and that the first source is located in the immediates stack;
determine, based on a page table entry of the first destination, that the first destination is located in the references stack;
determine, based on the first source being in the immediates stack and the first destination being located in the references stack, that the first instruction is invalid; and
trap the first instruction in response to determining that the first instruction is invalid.

10. The system of claim 9, wherein the thread further comprises:
a second instruction for moving a second data item from a second source to a second destination; and
wherein the execution engine further comprises functionality to:
determine, based on a page table entry of the second source, that the second data item is among the plurality of immediate values and that the second source is located in the immediates stack;
determine, based on a page table entry of the second destination, that the second destination is located in the immediates stack;
determine, based on the second source being in the immediates stack and the second destination being located in the immediates stack, that the second instruction is valid; and
execute the second instruction in response to determining the second instruction is valid.

11. The system of claim 9, wherein the thread further comprises:
a second instruction for moving a second data item from a second source to a second destination; and
wherein the execution engine further comprises functionality to:
determine, based on a page table entry of the second source, that the second data item is an object reference of the plurality of object references and that the second source is located in the references stack;
determine, based on a page table entry of the second destination, that the second destination is located in the immediates stack;
determine, based on the second source being in the references stack and the second destination being located in the immediates stack, that the second instruction is invalid; and
trap the second instruction in response to determining the second instruction is invalid.

12. The system of claim 9, further comprising:
a translation lookaside buffer (TLB) comprising the page table entry of the first source and the page table entry of the first destination,
wherein the execution engine further comprises functionality to:

obtain the page table entry of the first source and the page table entry of the first destination from the TLB.

\* \* \* \* \*